US012748752B2

(12) United States Patent
Liu et al.

(10) Patent No.: US 12,748,752 B2
(45) Date of Patent: Sep. 29, 2026

(54) DATA INTERACTION METHOD, APPARATUS, AND ELECTRONIC DEVICE

(71) Applicant: Beijing Zitiao Network Technology Co., Ltd., Beijing (CN)

(72) Inventors: Chongyang Liu, Beijing (CN); Fei Li, Beijing (CN); Chengkai Li, Beijing (CN); Jinxin Jiang, Beijing (CN); Fabin Liu, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 258 days.

(21) Appl. No.: 18/504,224

(22) Filed: Nov. 8, 2023

(65) Prior Publication Data

US 2024/0152504 A1 May 9, 2024

(30) Foreign Application Priority Data

Nov. 8, 2022 (CN) ......................... 202211395226.7

(51) Int. Cl.

| | |
|---|---|
| ***G06F 16/00*** | (2019.01) |
| ***G06F 16/23*** | (2019.01) |
| ***G06F 16/25*** | (2019.01) |
| ***G06Q 10/00*** | (2026.01) |
| ***G06Q 10/10*** | (2023.01) |

(52) U.S. Cl.
CPC ........ *G06F 16/2379* (2019.01); *G06F 16/258* (2019.01); *G06Q 10/103* (2013.01)

(58) Field of Classification Search
CPC ..................................................... G06F 16/258
See application file for complete search history.

(56) References Cited

U.S. PATENT DOCUMENTS

| | | | | |
|---|---|---|---|---|
| 2020/0004710 | A1* | 1/2020 | Peter | G06Q 30/0201 |
| 2021/0234860 | A1* | 7/2021 | Bansal | H04L 67/51 |
| 2021/0377210 | A1* | 12/2021 | Singh | H04L 67/125 |
| 2022/0303244 | A1* | 9/2022 | Wondra | H04L 63/0236 |
| 2023/0394478 | A1* | 12/2023 | Fuentes | G06N 20/00 |

FOREIGN PATENT DOCUMENTS

| | | | | |
|---|---|---|---|---|
| CN | 115374175 A | * | 11/2022 | G06F 40/18 |
| WO | WO-2019047540 A1 | * | 3/2019 | G06Q 40/04 |

* cited by examiner

*Primary Examiner* — Matheus Ribeiro Stivaletti
(74) *Attorney, Agent, or Firm* — Astute IP Law group

(57) ABSTRACT

The present disclosure provides a data interaction method and apparatus and an electronic device. The method is applied to a cloud service end. A specific implementation of the method comprises: establishing a long-connection communication channel with a local service end, the local service end comprising a target transaction system to be integrated; receiving first target data sent by the local service end through the long-connection communication channel, the first target data being obtained based on updated first transaction data of the target transaction system; performing data update using the first target data. In the implementation, the target transaction system included by the local service end needn't to be exposed to an external network, thereby improving the security of data interaction, reducing the number of times of establishing the communication connection between the local service end and the cloud service end, and improving the efficiency of data interaction.

20 Claims, 6 Drawing Sheets

DATA INTERACTION METHOD, APPARATUS, AND ELECTRONIC DEVICE

CROSS-REFERENCE TO RELATED APPLICATION(S)

This application claims priority to Chinese Application No. 202211395226.7 filed in Nov. 8, 2022, the disclosures of which are incorporated herein by reference in their entities.

FIELD

The present disclosure relates to the technical field of computers, and particularly to a data interaction method, apparatus and an electronic device.

BACKGROUND

At present, various enterprise-orientated transaction management systems are widely used in various industries to provide more convenience for transaction management of enterprises. Enterprises usually employ different transaction management systems for different transactions. Users need to spend time constantly switching different transaction systems to view and process the service of different systems, the operations are tedious and time-consuming and also prone to lead to omission, so that some transactions cannot be processed in time, which affects the management efficiency of enterprises.

SUMMARY

The present disclosure provides a data interaction method, apparatus and electronic device.

According to a first aspect, there is provided a data interaction method, method being applied to a cloud service end, method comprising:

- establishing a long-connection communication channel with a local service end, the local service end comprising a target transaction system to be integrated;
- receiving first target data sent by the local service end through the long-connection communication channel, the first target data being obtained based on updated first transaction data of the target transaction system;
- performing data update using the first target data.

According to a second aspect, there is provided a data interaction apparatus, the apparatus being applied to a cloud service end, and the apparatus comprising:

- a communication module configured to establish a long-connection communication channel with a local service end; receive first target data sent by the local service end through the long-connection communication channel; the local service end comprises a target transaction system to be integrated; the first target data is obtained based on updated first transaction data of the target transaction system;
- a transaction module configured to obtain the first target data from the communication module and perform data update using the first target data.

According to a third aspect, there is provided a computer readable storage medium storing a computer program which, when executed by a processor, implements any of the method of the first aspect.

According to a fourth aspect, there is provided an electronic device comprising a memory, a processor and a computer program stored on the memory and executable on the processor, the processor implementing any of the method of the first aspect upon executing the program.

The technical solutions provided by the embodiments of the present disclosure may include the following advantageous effects:

Embodiments of the present disclosure provide the data interaction method and apparatus. The long-connection communication channel is established between a local service end and a cloud service end, the cloud service end receives the first target data sent by the local service end through the long-connection communication channel, the first target data is obtained based on the updated first transaction data in the target transaction system included in the local service end, the cloud service end uses the first target data to update data. Thus, the integration of the target transaction system and the cloud service end to a certain extent is achieved without modifying the target transaction system to be integrated included in the local service end. Since the local service end and the cloud service end perform data interaction through the long-connection communication channel, the target transaction system does not need to be exposed to an external network, thereby improving the security of data interaction, reducing the number of times of establishing the communication connection between the local service end and the cloud service end, and improving the efficiency of data interaction.

It is to be understood that both the foregoing general description and the following detailed description are exemplary and illustrative only and are not intended to limit the present disclosure.

BRIEF DESCRIPTION OF THE DRAWINGS

Figures to be used in the depictions of embodiments will be introduced briefly in order to illustrate technical solutions of embodiments of the present disclosure more clearly. It is obvious that the figures in the following depictions are merely some embodiments described in the present description, and those skilled in the art man further obtain other figures according to these figures without making any inventive efforts.

DETAILED DESCRIPTION OF EMBODIMENTS

To enable those skilled in the art to better understand technical solutions in the disclosure, the technical solutions in embodiments in the disclosure will be described below clearly and completely with reference to figures in the embodiments of the disclosure. Obviously, the described embodiments are only partial embodiments in the disclosure rather than all embodiments. All other embodiments obtained by those skilled in the art without making inventive efforts based on the embodiments in the disclosure should fall within the scope of protection of the present disclosure.

Where the following depictions involve figures, the same numbers in different figures denote the same or similar elements, unless otherwise indicated. The embodiments described in the following exemplary embodiments do not represent all embodiments consistent with the present disclosure. Rather, they are merely examples of apparatus and methods consistent with certain aspects of the present disclosure, as detailed in the appended claims.

The terminology used in the present disclosure is only intended to describe specific embodiments and is not intended to limit the present disclosure. As used in the present disclosure, "a", "said" and "the" in singular forms are also intended to include plural forms unless the context clearly indicates otherwise. It should also be understood that the term "and/or" as used herein refers to and contains any or all possible combinations of one or more of the associated listed items.

It should be understood that, although the terms such as "first", "second" and "third" might be used in the present disclosure to describe various information, such information should not be limited to these terms. These terms are only used to distinguish the same type of information from each other. For example, first information may also be referred to as second information, and similarly, second information may also be referred to as first information, without departing from the scope of the present disclosure. Depending on the context, the word "if" as used herein may be interpreted as "when . . . " or "in response to determining".

At present, various enterprise-orientated transaction management systems are widely used in various industries to provide more convenience for transaction management of enterprises, wherein the enterprise-oriented transaction management systems may comprise a local management system deployed locally to the enterprise and a platform management system (e.g., a SaaS system) provided by a network platform.

Figure 1:
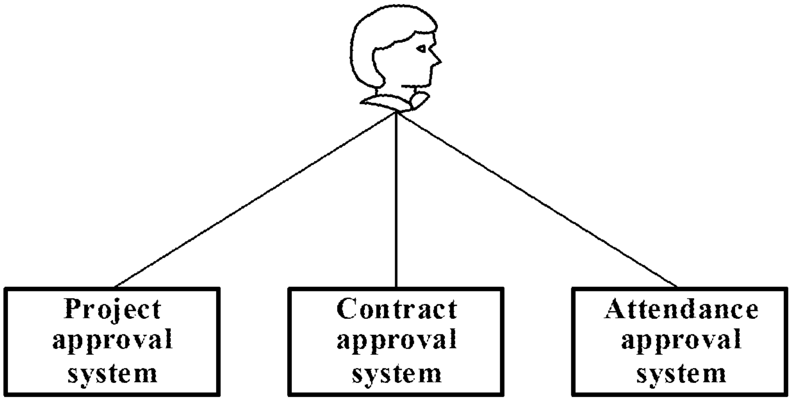
FIG. 1 is an interaction scenario between a user and different approval transaction management systems according to an exemplary embodiment of the present disclosure.

Enterprises usually employ different transaction management systems for different transactions. Taking approval transaction as an example, FIG. 1 shows an interaction scenario between a user and different approval transaction management systems, for example, an enterprise may manage a project approval transaction using a project approval system, manage an attendance approval transaction using an attendance approval system, manage a contract approval transaction using a contract approval system, etc. The project approval system, attendance approval system and the contract approval system all belong to different approval transaction management systems. As shown in FIG. 1, a user needs to spend time continuously switching different approval transaction management systems to view and process the approval transactions of different systems, the operations are tedious and time-consuming and also prone to lead to omission, so that some approval transactions cannot be processed in time, which affects the management efficiency of enterprises.

Figure 2:
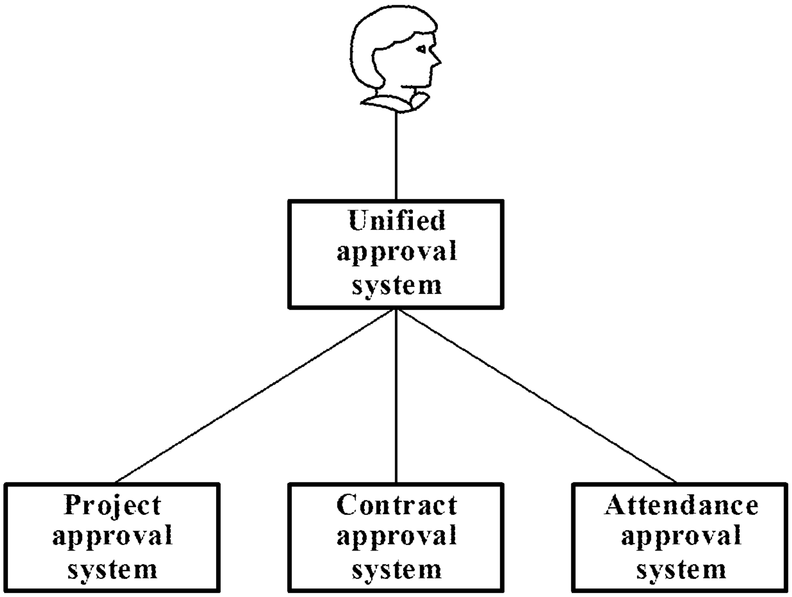
FIG. 2 is an interaction scenario between another user and different approval transaction management systems according to an exemplary embodiment of the present disclosure.

Also taking the above-mentioned approval transaction as an example, FIG. 2 shows an interaction scenario between another user and different approval transaction management systems. As shown in FIG. 2, respective service data of the project approval system, the attendance approval system and the contract approval system are integrated into a unified transaction system provided by a network platform, for example. The user can directly view and process the approval transactions of different systems through the unified transaction system without taking time to constantly switch different approval transaction management systems, thereby improving the management efficiency of the approval transactions.

In the related art, it is generally necessary to integrate service data of transaction systems to be integrated into a unified transaction system by modifying the transaction systems to be integrated to allow them to provide better open interfaces. However, modifying of the systems also consumes a lot of resources, and the integration effect is not ideal.

In order to avoid resource consumption caused by the modification of the transaction systems to be integrated, a connector for adaptation may be set for target transaction systems to be integrated, the connector is used to collect service data updated by the target transaction systems to be integrated, convert the service data into target data adapted to a unified transaction system according to a preset rule, and transmit the target data to the unified transaction system to perform transaction processing based on the target data in the unified transaction system. Since frequent data interaction is required between the target transaction systems and the unified transaction system, a secure and efficient data interaction solution is required.

The present disclosure provides a data interaction method: establishing a long-connection communication channel between a local service end and a cloud service end, the cloud service end receiving first target data sent by the local service end through the long-connection communication channel, the first target data being obtained based on the updated first transaction data in the target transaction system included in the local service end, the cloud service end using the first target data to update data. Thus, the integration of the target transaction system and the cloud service end to a certain extent is achieved without modifying the target transaction system to be integrated included in the local service end. Since the local service end and the cloud service end perform data interaction through the long-connection communication channel, the target transaction system does not need to be exposed to the external network, thereby improving the security of data interaction, reducing the number of times of establishing the communication connection between the local service end and the cloud service end, and improving the efficiency of data interaction.

Figure 3:
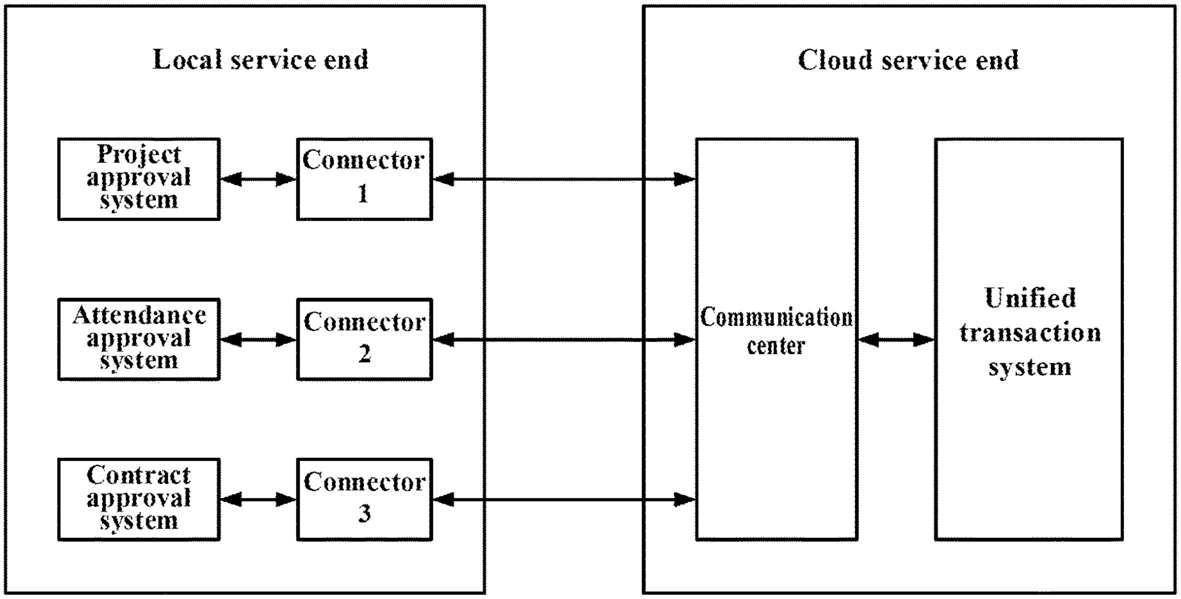
FIG. 3 is a scenario diagram illustrating a data interaction scheme according to an exemplary embodiment of the present disclosure.

Referring to FIG. 3, it shows a schematic diagram of a scenario for a data interaction scheme according to an exemplary embodiment.

The data interaction scheme may be applied to a transaction integration system, and the transaction integration system may comprise a local service end and a cloud service end. The local server may comprise a plurality of target transaction systems to be integrated and a connector deployed for each target transaction system, wherein the connector may for example comprise a collector as a separate application, or a service plug-in as a separate application, etc. The cloud service end may comprise a unified transaction system and a communication center deployed for the unified transaction system, wherein the unified transaction system may be used for processing service data of the plurality of different target transaction systems. The communication center may be, for example, a communication module as a separate application.

First, a long-connection communication channel may be established between the connector included by the local service end and the communication center included by the cloud service end, thereby establishing the communication connection between the local service end and the cloud service end. Then, on the side of the local service end, the connector collects first transaction data updated by the target transaction system, and generates first target data based on the first transaction data. Wherein the first target data may comprise first data and/or second data, and the first data is data converted from the first transaction data according to a preset rule and adapted to the unified transaction system. The second data is data generated based on the first transaction data, for example, the second data may comprise address information corresponding to the first transaction data, etc. Then, the connector may send the first target data to the cloud service end through the long connection communication channel.

On the side of the cloud service end, the communication center receives the first target data sent by the connector through the long connection communication channel, and sends the first target data to the unified transaction system. The unified transaction system receives the first target data sent by the communication center, and may use the first target data to update a database of the unified transaction system. The unified transaction system may also, in response to the user's triggering operation, provide a transaction processing interface to the user for transaction processing based on the first target data.

Specifically, taking the above-mentioned project approval transaction as an example, as shown in FIG. 3, for example, an enterprise manages the project approval transaction using the project approval system, manages the attendance approval transaction using the attendance approval system, and manages the contract approval transaction using the contract approval system. A local service end is deployed in a local server/server cluster of the enterprise, and the local service end comprises the project approval system, the attendance approval system and the contract approval system.

For the project approval system, a connector 1 is installed in the local service end. For the attendance approval system, a connector 2 is installed in the local service end. For the contract approval system, a connector 3 is installed in the local service end. Each connector may comprise a collector, a service plug-in, an account checker and a communication plug-in, wherein the collector, the service plug-in, the account checker and the communication plug-in may all be separate applications.

With regard to the unified transaction system, a communication center is installed in the cloud service end, and the communication center may also be a communication module as a separate application program, etc. A long-connection communication channel is established between each connector in the local service end and the communication center, and each connector may perform data interaction with the communication center of the cloud service end through the long-connection communication channel.

Hereunder, taking the project approval system as an example, a processing and interaction process of the approval transaction data is described. First, the user may perform an operation of the project approval transaction such as creating and submitting an approval task, through a client corresponding to the project approval system so as to update service data of the project approval system. Every time period T1, the connector 1 may request to obtain service data A of a preset field updated during the time period T1 from the database of the project approval system.

Then, the connector 1 may convert the service data A into first data a1 adapted to the unified transaction system according to a rule previously set for the project approval system based on the unified transaction system. Second data a2 may also be generated based on the service data A, e.g., the second data a2 may be a resource locator URL of the approval transaction involved by the service data A. Furthermore, the first data a1 and/or the second data a2 are sent to the communication center of the cloud service end through the long-connection communication channel, and the communication center sends the first data a1 and/or the second data a2 to the unified transaction system, and the unified transaction system may update the database using the first data a1 and/or the second data a2.

If an error occurs or data loss occurs in the process of updating the database by the unified transaction system, causing an update failure, the unified transaction system may send a data resend request q to the connector 1 through the communication center. After receiving the data resend request q, the connector 1 may transmit the resent data to the communication center of the cloud service end through the long-connection communication channel based on the data resend request q, and the communication center transmits the resent data to the unified transaction system, and the unified transaction system may use the resent data to re-update the database. Thus, the project approval transaction data in the project approval system and the project approval transaction data in the unified transaction system always remain synchronized. Wherein the project approval transaction data corresponds to a plurality of project approval tasks.

Since the project approval transaction data stored in the database of the unified transaction system maintains synchronized with the project approval transaction data in the project approval system, the user may process the project approval task corresponding to the project approval transaction data through the client of the unified transaction system. Specifically, the unified transaction system may provide a transaction processing interface to the user through the client, and the user may perform a processing operation on at least one target project approval task M to be processed through the transaction processing interface. For example, the processing operation may be a detailed view of a single target project approval task M, or may be a unified process of batch target project approval tasks M, etc.

The unified transaction system may then generate task data based on the user's processing operations. The task data may include, for example, a resource locator URL corresponding to the at least one target project approval task M and processing information for the at least one target project approval task M, etc. For example, in a first scenario, if the user wants to view detailed information of the target project approval task M, the task data may include a resource locator URL corresponding to the target project approval task M and indication information for indicating to view details of the target project approval task M. As another example, in the second scenario, if the user wants to update the status of the batch target project approval tasks M to an approved status, the task data may comprise a resource locator (URL) corresponding to the batch target project approval tasks M and update information for updating the status of the batch target project approval tasks M to the approved status.

The task data is sent to the connector 1 by the communication center through the long-connection communication channel. The connector 1 may generate target task data adapted to the project approval system based on the task data and transmit the target task data to the project approval system, and the project approval system may perform task processing based on the target task data. For example, in a first scenario, the task processing may be to provide the user with a viewing interface for viewing details of the target project approval task M through the client of the project approval system based on the above-mentioned indication information included in the target task data. For another example, in the second scenario, the task processing may be updating project approval transaction data corresponding to the target project approval task M in the database based on the above-mentioned update information included in the target task data.

Optionally, if in the second scenario, the project approval system may feed back a update progress to the unified transaction system in the process of updating the database, in real time or every preset period of time or every preset amount of data processing. For example, every time the project approval transaction data corresponding to a preset number of target project approval tasks is completed, the update progress may be sent to the communication center of the cloud service end through the connector 1, and the communication center feeds back the update progress to the unified transaction system. The unified transaction system may update the processing progress corresponding to the target project approval task M based on the update progress, and present the processing progress corresponding to the target project approval task M to the user through the transaction processing interface in the client.

Further optionally, if in the second scenario, in the case of failure to update the database, the project approval system may send the task data resend request p to the communication center of the cloud service end through the connector 1, and the communication center sends the task data resend request p to the unified transaction system. The unified traffic system may transmit the resent task data to the connector 1 of the local service end through the communication center based on the task data resend request p. The connector 1 then sends the resent task data to the project approval system, and the project approval system may re-update the service data in the database based on the resent task data.

In addition, further optionally, as for the project approval system, every time period T2, the connector 1 corresponding to the project approval system may request from the project approval system to obtain update information B of the service data updated by the project approval system during the time period T2, for example, the update information B may include but is not limited to information such as identification information of the updated service data and the update time during the time period T2. The connector 1 may send a check request to the unified transaction system through the communication center of the cloud service end so as to request the unified transaction system to check whether the data of the unified transaction system and the project approval system are synchronized according to the update information B. Wherein, if it is determined that the data are synchronized, the check is successful, and if it is determined that the data are not synchronized, the check fails. Then, a result of the success or failure of the check is returned to the connector 1 by the unified transaction system through the communication center.

In a case where the check fails, the connector 1 obtains, from the database of the project approval system, service data E of a preset field updated during the period T2, and converts the service data E to obtain third data e1 adapted to the unified transaction system, and may further generate fourth data e2 based on the service data E, for example, the fourth data e2 may comprise a resource locator (URL) of an approval task involved by the service data E. The third data e1 and/or the fourth data e2 are sent to the communication center of the cloud service end through the long-connection communication channel, and the communication center sends the third data e1 and/or the fourth data e2 to the unified transaction system, and the unified transaction system may update the database using the third data e1 and/or the fourth data e2 so as to further ensure the synchronization of the project approval transaction data in the project approval system and the project approval transaction data in the unified transaction system.

Likewise, processing and interaction processes of the approval transaction data of the attendance approval system and the contract approval system are similar to that of the above-mentioned project approval system and will not be described in detail herein. It is appreciated that in some embodiments, the time period T1 may be much less than the time period T2, the time period T1 may be for example a few seconds or milliseconds, the time period T2 may be for example a few hours or days, etc. By setting the time period T1, the service demands of each target transaction system may be processed by the unified transaction system in time; by setting the time period T2, the data synchronization situation between the unified transaction system and each target transaction system may be verified, so as to improve the system stability; meanwhile, since T1<T2, and since in some embodiments, the time period T2 may be set to be much greater than T1, for example, T2 is 50 times or even 500 times greater than T1, the system burden may be further reduced and the performance may be improved.

It may be seen from the above embodiments that the unified transaction system may centrally manage partial service data of each target transaction system and process corresponding service demands based on partial service data information such as updated service data identification and update time information of each target transaction system to be integrated. The user may view tasks involved in partial service data of each target transaction system through the client of the unified transaction system, and may also uniformly process batch tasks involved in the partial service data of each target transaction system through the client of the unified transaction system, etc. For example, the user may view project approval tasks, attendance approval tasks, and contract approval tasks through the client of the unified transaction system. The client of the unified transaction system may also send tasks to be handled, timed reminders, etc. of each target transaction system to the user. Therefore, the present embodiment realizes the integration of the target transaction systems and the unified transaction system to a certain extent based on the user's demands, facilitates approval transaction processing in the unified transaction system, and improves the integration effect on a premise that the local approval transaction systems to be integrated does not need to be greatly modified. In addition, the data interaction between the unified transaction system and each target transaction system is performed through the long-connection communication channel, so that the target transaction system needn't be exposed to an external network, the security of the data interaction is improved, the number of times of establishing communication connections between the target transaction system and the unified transaction system is reduced, and the efficiency of the data interaction is improved.

The present disclosure will now be described in detail with reference to specific embodiments.

Figure 4:
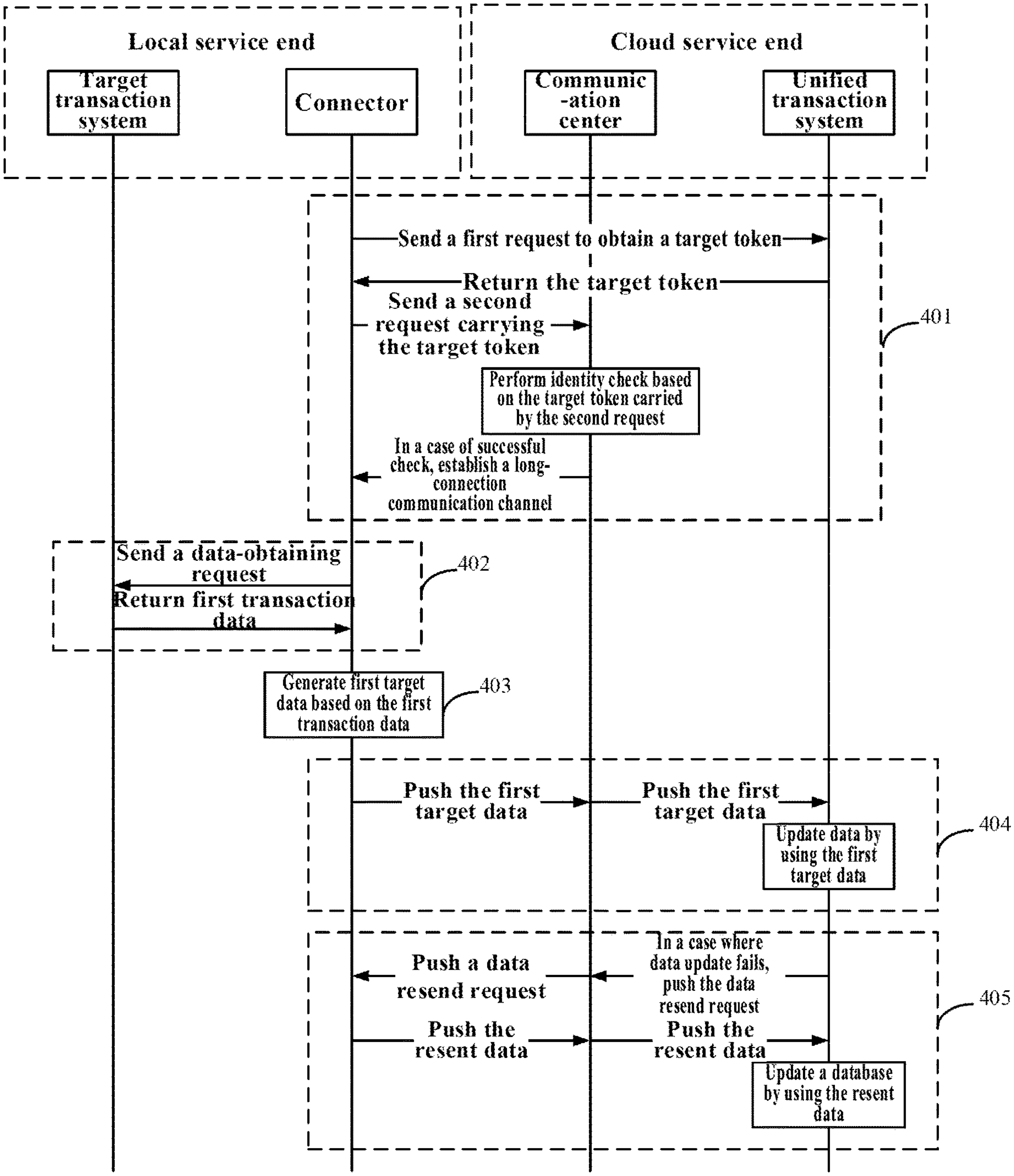
FIG. 4 is a flow chart of a data interaction method according to an exemplary embodiment of the present disclosure.

FIG. 4 is a flow chart illustrating a data interaction method according to an exemplary embodiment. The embodiment involves a local service end and a cloud service end, wherein the local service end may comprise a plurality of target transaction systems to be integrated and a connector provided for each target transaction system. The target transaction system may be, for example, a local transaction system deployed locally to the enterprise. The connector is an application deployed for the target transaction system. The cloud service end may comprise a communication center and a unified transaction system, wherein the unified transaction system may be, for example, a cloud transaction management system such as a SaaS system provided by a network platform, and the unified transaction system may be used for managing service data from a plurality of different target transaction systems. The communication center may be an application for communication deployed for the unified transaction system. The transactions involved in the present embodiment may be various transactions completed by multi-party interaction, for example, may be approval transactions, etc. The method may comprise the following steps:

As shown in FIG. 4, in step 401, the cloud service end establishes a long-connection communication channel with the connector included in the local service end through the communication center.

In the present embodiment, firstly, the local service end communicates with the cloud service end through, for example, an http protocol; when the connector included in the local service end is activated after being deployed, a first request may be sent to the unified transaction system included in the cloud service end through the http protocol, wherein the first request is a request to obtain a target token, and the first request carries identity information of the connector. After receiving the first request, the unified transaction system sends the identity information of the connector to the communication center included in the cloud service end based on the first request; the communication center registers the connector based on the identity information of the connector and generates a target token; and the unified transaction system returns the target token to the connector.

The connector may then send a second request to the communication center through for example an http protocol, the second request is a request to establish the long-connection communication channel, and the second request carries a target token. After receiving the second request, the communications center may perform an identity check on the connector based on the target token carried in the second request. In a case where the identity check passed, the communication center may upgrade the communication protocol between it and the connector from a first protocol, such as the http protocol, to a second protocol, such as a websocket protocol, capable of establishing the long connection, and send a connection response message to the connector, thereby completing the establishment of the long connection, such as a TCP connection, between the connector and the communication center. The long connection may be two-way multiplexed. Therefore, after this, the connector included in the local service end and the communication center included in the cloud service end may perform data interaction at any time through the long-connection communication channel, without repeatedly establishing the connection, thereby reducing resource consumption. Furthermore, by upgrading the communication protocol between the communication center and the connector from the first protocol to the second protocol when the identity check passes, and establishing the long connection through the second protocol, the data resend may be performed in time when the data transmission fails, and the data processing progress may be updated in time when the data processing progress changes, so that the data synchronization between the target transaction system and the unified transaction system is more reliable and timely.

In step 402, the connector obtains updated first transaction data in the target transaction system.

In the present embodiment, the connector, based on a preset field, requests from the target transaction system to obtain updated partial service data in the target transaction system, as first transaction data. In one implementation, the connector activates a timed task and detects a signal indicative of activation of the timed task. When the signal indicative of activation of the timed task is detected, a target time of the activation of a previous timed task is obtained, and service data corresponding to the preset field is obtained from the updated service data in the target transaction system in a time period from the target time and the current time, as the first transaction data. For example, the connector starts a timer, detects the signal indicative of activation of the timed task at time t1, and obtains a pre-recorded time stamp t2 of the last data collection (namely, the time t2 when the last time task is activated). Then, the connector may send a data acquisition request to the target transaction system, and requests to obtain service data that a preset field is updated in the target transaction system within the time period from time t2 to time t1, as the first transaction data. For example, the preset field may include, but not limited to, a field representing a transaction status, a field representing a service identification, a field representing a service node, a field representing a service update, etc. The time t1 is recorded as the time stamp of the data collection of this time for use in the next data collection.

In another implementation, the connector may also detect (for example, detect through a subscription mechanism) an update condition of the service data in the target transaction system, and after the service data in the target transaction system is updated, the connector may send a data acquisition request to the target transaction system, requesting to obtain first transaction data that update has occurred with the preset field.

In step 403, the connector generates first target data based on the first transaction data.

In the present embodiment, the first target data may comprise first data and/or second data. The first data may be data converted by the connector from the obtained first transaction data according to a preset rule and adapted to the unified transaction system. The second data may be data generated by the connector based on the first transaction data, for example, the second data may comprise address information (such as a resource locator (URL)) corresponding to the first transaction data, and the first transaction data may be found from a database through the second data.

The preset rule may be a conversion rule set for a local transaction system based on the unified transaction system in advance. Specifically, the data adapted to the transaction system corresponds to a plurality of fields, and comprises field values corresponding to the respective fields, etc. For example, field names and field values of the same fields included in the data adapted to the target transaction system and the data adapted to the unified transaction system might be partially different. The conversion rule may be preset, and then field values of the preset fields corresponding to the obtained first transaction data are added under target fields adapted to the unified transaction system according to the conversion rule so as to be converted into the first data.

For example, a case where the field names of the same field are different is as follows: in the preset rule, the field name of a field included in the data adapted to the target transaction system is Remark, whereas the field name of the same field included in the data adapted to the unified transaction system is status. If the field value of the field whose field name is Remark in the first transaction data obtained by the connector is m, the field value m may be added under the status field of the first transaction data according to the preset rule.

As another example, a case where field values of the same field are different is as follows: in the preset rule, when the field value of the field whose field name is F is w in the data adapted to the target transaction system, the field value of the field whose field name is also F in the data adapted to the unified transaction system should correspondingly be u. That is to say, when the value of the field indicates the same physical meaning for the same field, the value of the same field in the target transaction system might be different from the value in the unified transaction system. For example, when the value of the approval status field in the target transaction system is w, this indicates that the first-level approval has passed. When the value is u in the unified transaction system, this indicates that the first-level approval has passed. If the field value of the field whose field name is F in the first transaction data obtained by the connector is w, the field value u may be added under the F field of the first transaction data according to the preset rule. A technical solution in the case where the field values of the same field are different may also be used in combination with a technical solution in the case where the field names of the same field are different.

In step 404, the connector transmits the first target data to the unified transaction system, and the unified transaction system updates the data in the database of the unified transaction system with the first target data.

In the present embodiment, the connector may transmit the first target data to the communication center through the above-mentioned long-connection communication channel, and the communication center then transmits the first target data to the unified transaction system. After receiving the first target data, the unified transaction system may update the data in the database with the first target data.

In step 405, in a case where the unified transaction system fails to update the database, update-failed data is re-obtained through the long-connection communication channel, and the database is re-updated.

In the present embodiment, if an error occurs or data loss occurs while the unified transaction system updates the database so that the update fails, the unified transaction system may send a data resend request to the connector through the communication center. The data resend request carries an identification of the data to be resent. In response to receiving the data resend request, the connector may re-obtain the data to be resent based on the identification of the data carried in the data resend request. Furthermore, the resent data is sent to the communication center through the long-connection communication channel, the communication center sends the resent data to the unified transaction system, and the unified transaction system may use the resent data to re-update the database. Thus, service data in the target transaction system and the unified transaction system may always be kept synchronized.

The present disclosure provides the data interaction method. The long-connection communication channel is established between the local service end and the cloud service end; the cloud service end receives first target data sent by the local service end through the long-connection communication channel; the first target data is obtained based on first transaction data updated by the target transaction system included in the local service end; and the cloud service end uses the first target data to update data. Thus, the integration of the target transaction system with the cloud service end to a certain extent is achieved without modifying the target transaction system to be integrated included in the local service end; since the local service end and the cloud service end perform data interaction through the long-connection communication channel, the target transaction system needn't to be exposed to an external network, the security of data interaction is improved, the number of times of establishing the communication connection between the local service end and the cloud service end is reduced, and the efficiency of data interaction is improved.

Figure 5:
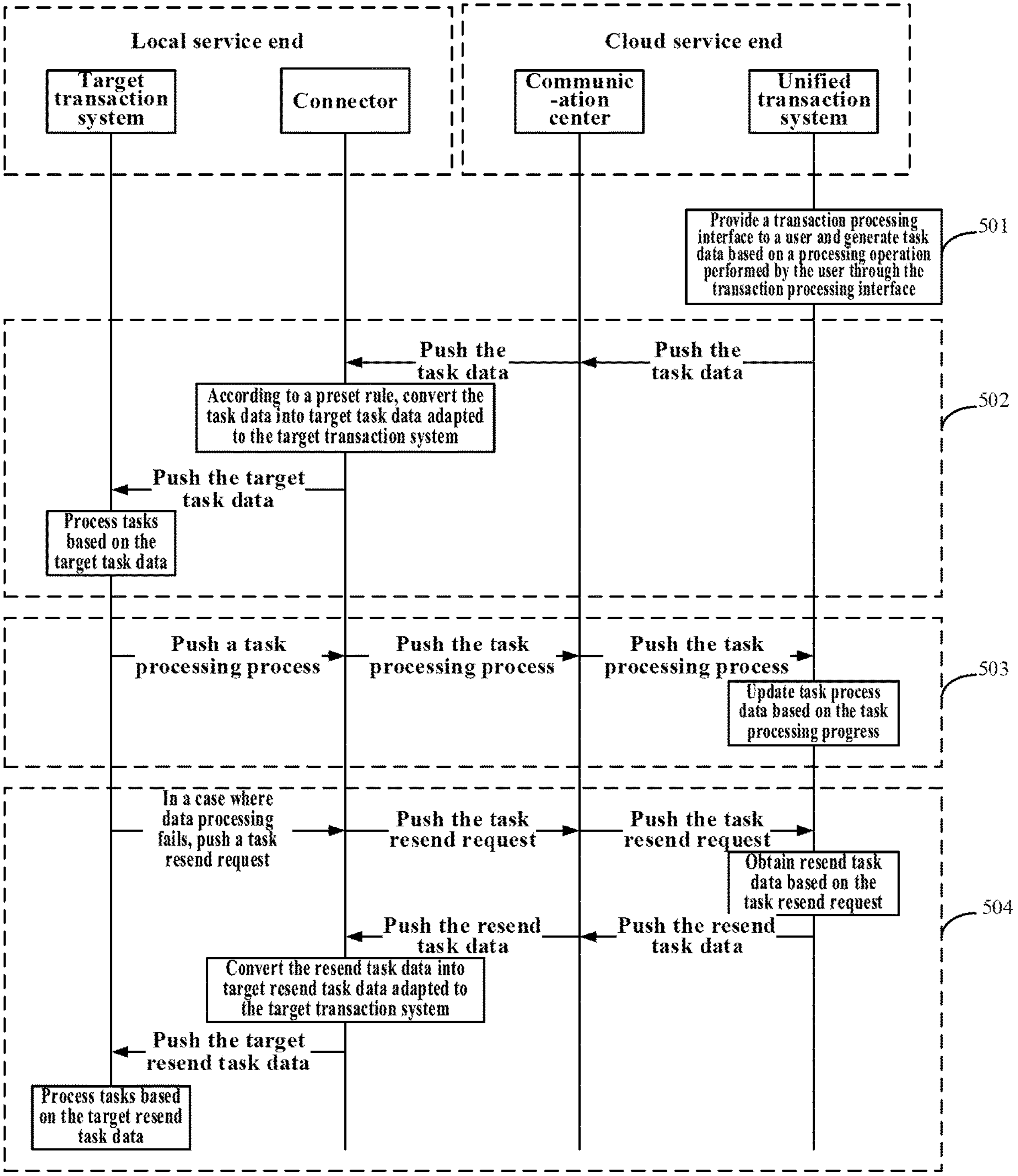
FIG. 5 is a flow chart of another data interaction method according to an exemplary embodiment of the present disclosure.

FIG. 5 is a flow chart of another data interaction method according to an exemplary embodiment. The embodiment describes a process of a batch of processing tasks, comprising the steps:

As shown in FIG. 5, in step 501, a unified transaction system provides a transaction processing interface to a user and generates task data based on a processing operation performed by the user through the transaction processing interface.

In the present embodiment, the service data stored in the database of the unified transaction system may involve a plurality of tasks to be processed, the unified transaction system may provide the transaction processing interface to the user based on the service data in the database, and the user may perform a processing operation on at least one target task involved by the service data in the database through the transaction processing interface. For example, the user may click to view details of a target task. As another example, the user may also perform unified processing on a batch of target tasks, etc.

The unified transaction system may generate task data according to a processing operation performed by the user on at least one target task through the transaction processing interface. The task data may comprise, for example, a resource locator (URL) corresponding to the target task and processing information of the target task. For example, the processing information may include indication information for indicating to view details of the target task. As another example, the processing information may further include update information for uniformly updating the state of the batch of target tasks.

In step 502, the unified transaction system transmits the task data to the connector, the connector obtains target task data adapted to the target transaction system based on the task data, and transmits the target task data to the target transaction system, and the target transaction system processes the task based on the target task data.

In the present embodiment, the unified transaction system may transmit the task data to the communication center, and the communication center transmits the task data to the connector through the long-connection communication channel. The connector may generate target task data adapted to the target transaction system based on the task data and send the target task data to the target transaction system, and the target transaction system performs task processing based on the target task data.

For example, if the user clicks to view details of the target task, the target transaction system may obtain a resource locator (URL) corresponding to the target task based on the target task data, and provide a details view interface of the target task to a client of the user based on the resource locator (URL). As another example, if the user performs uniform processing on a batch of target tasks, the target transaction system may obtain resource locators (URL) corresponding to the batch of target tasks based on the target task data, and find the batch of target tasks based on the resource locators (URL) to perform processing one by one.

Optionally, if the user performs unified processing on the batch of target tasks, in step 503 the target transaction system actively feeds back a task processing progress to the unified transaction system, and the unified transaction system updates task progress data based on the task processing progress.

In the present embodiment, the target transaction system may feed the task processing progress back to the unified transaction system whenever completing a preset number of target tasks in the batch of target tasks. Specifically, the target transaction system may first push the task processing progress to the connector, the connector pushes the task processing progress to the communication center through the long connection channel, and the communication center pushes the task processing progress to the unified transaction system. After receiving the task processing progress, the unified transaction system may update task progress data according to the task processing progress, and may also provide the task progress data to the user for viewing. Since the local service end and the cloud service end perform data interaction through the long-connection communication channel, after completing a preset number of target tasks, the target transaction system included in the local service end can feed back the task processing progress to the unified transaction system included in the cloud service end in time, thereby updating the task progress data in time and improving the user experience.

In one implementation, the task progress data may be a percentage of the target tasks whose processing has been finished, among the target tasks uniformly processed by the user in a batch. In another implementation, the task progress data may be a ratio of the number of target tasks whose processing has been finished to a total number of target tasks among the target tasks uniformly processed by the user in a batch (e.g., the numerator is the number of target tasks whose processing has been finished, and the denominator is the total number of the target tasks uniformly processed by the user in a batch).

In step 504, in a case of a failure to process the task, the target transaction system transmits a task resend request to the unified transaction system, and the unified transaction system retransmits resent task data corresponding to the target task whose processing is failed.

In the present embodiment, after the target transaction system fails to process the task, the target transaction system may send a task resend request to the communication center through the connector, wherein the task resend request carries identification information about the target task whose processing is failed. The unified transaction system receives the task resend request sent by the communication center, re-obtains resend task data corresponding to the target task whose processing is failed, based on the task resend request, and sends the resend task data to the target transaction system. Specifically, the unified transaction system may send the resend task data to the communication center, the communication center sends the resend task data to the connector through the long connection communication channel, and the connector performs conversion processing on the resend task data to obtain target resend task data adapted to the target transaction system, and sends the target resend task data to the target transaction system for re-processing.

It should be noted that although in the embodiments described above, the operations of the method of embodiments of the present disclosure have been described in a particular order, this does not require or imply that the operations must be performed in that particular order, or this does mean that all illustrated operations must be performed, to achieve a desired result. Rather, the steps depicted in the flowcharts may be executed in a variant order. Additionally or alternatively, certain steps may be omitted, multiple steps may be combined into one step for execution, and/or one step may be divided into multiple steps for execution.

Corresponding to the aforementioned embodiments of the data interaction method, the present disclosure also provides embodiments of a data interaction apparatus.

Figure 6:
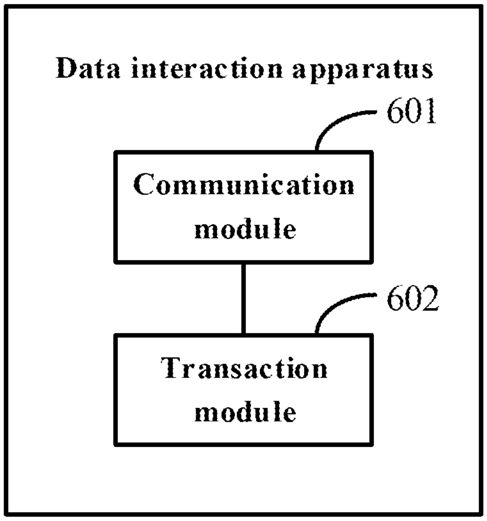
FIG. 6 is a block diagram of a data interaction apparatus according to an exemplary embodiment of the present disclosure.

As shown in FIG. 6, FIG. 6 is a block diagram of a data interaction apparatus shown according to an exemplary embodiment of the present disclosure. The apparatus is applied to a cloud service end, and the apparatus may comprise: a communication module 601 and a transaction module 602.

The communication module 601 is configured to establish a long-connection communication channel with a local service end, and receive first target data sent by the local service end through the long-connection communication channel. The local service end comprises a target transaction system to be integrated, and the first target data is obtained based on updated first transaction data of the target transaction system.

The transaction module 602 is configured to obtain the first target data from the communication module 601 and perform data update using the first target data.

In some embodiments, the local service end may further comprise a connector deployed for the target transaction system. The long-connection communication channel is established between the communication module 601 and the connector.

The communication module 601 is configured to receive the first target data sent by the connector through the long-connection communication channel, and transmit the first target data to the transaction module 602.

In other embodiments, the long-connection communication channel is established between the communication module 601 and the connector in the following manner:

The transaction module 602 receives a first request which is sent by the connector to obtain a target token, obtains the target token from the communication module 601, and returns the target token to the connector.

The communication module 601 receives a second request which is sent by the connector and carries the target token, performs identity check based on the target token, and establishes the long-connection communication channel with the connector when the identity check passes.

In other embodiments, transaction module 602 is further configured to, in a case where data update fails, send a data resent request through the communication module 601 via the long-connection communication channel to the connector.

The communication module 601 is further configured to receive data resent by the connector based on the data resend request and transmits the resent data to the transaction module 602.

In other embodiments, the transaction module 602 is further configured to provide the user with a transaction processing interface, and generate task data based on a processing operation performed by the user through the transaction processing interface, the task data corresponding to at least one target task. Through the communication module 601, the above-mentioned task data is sent to the connector through the long-connection communication channel, so that after converting the task data into target task data, the connector transmits the target task data to the target transaction system, and the target transaction system processes the target task based on the target task data.

In other embodiments, the processing operation performed by the user through the transaction processing interface comprises batch unified processing performed on the target tasks.

In other embodiments, after sending the task data to the connector, the communication module 601 is further configured to receive a task processing progress of processing the target task sent by the target transaction system through the connector, and send the task processing progress to the transaction module 602.

The transaction module 602 is further configured to update task progress data based on the task processing progress.

In other embodiments, after sending the task data to the connector, the communication module 601 is further configured to receive a task resend request sent by the target transaction system in the case of failed task processing, and send the task resend request to the transaction module 602.

The transaction module 602 is further configured to obtain resend task data based on the task resend request, and transmit the resend task data to the connector through the long-connection communication channel through the communication module 601.

As far as the apparatus embodiment is concerned, since it substantially corresponds to the method embodiment, reference is made to the part of the description of the method embodiments for relevant parts. The apparatus embodiment described above is merely illustrative, wherein units illustrated as separate components may be or may not be physically separated, and members shown as units may be or may not be physical units, i.e., they may be located at one place, or may be distributed over a plurality of network elements. Some or all of the modules may be selected to achieve the objectives of embodiments of the present disclosure according to actual needs. Those skilled in the art may understand and implement the embodiments without making any inventive efforts.

Figure 7:
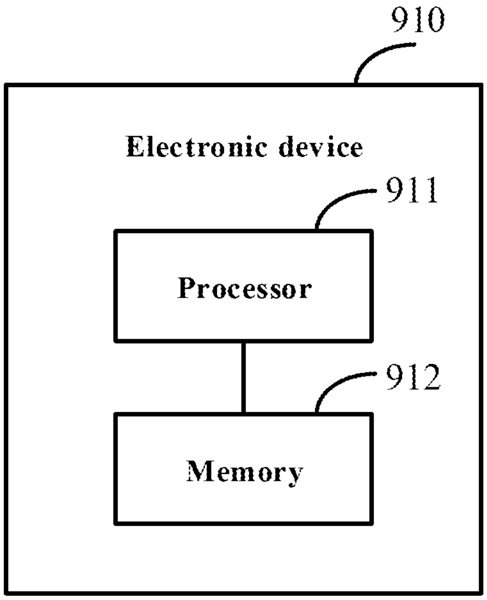
FIG. 7 is a schematic block diagram of an electronic device provided by some embodiments of the present disclosure.

FIG. 7 is a schematic block diagram of an electronic device provided according to some embodiments of the present disclosure. As shown in FIG. 7, the electronic device 910 comprises a processor 911 and a memory 912 that may be used to implement a client or a server. The memory 912 is used to non-transiently store computer-executable instructions (e.g., one or more computer program modules). The processor 911 is used to run the computer-executable instructions that, when executed by the processor 911, may perform one or more of the steps of the data interaction methods described above, thereby implementing the data interaction methods described above. The memory 912 and processor 911 may be interconnected by a bus system and/or a connection mechanism in other forms (not shown).

For example, the processor 911 may be a central processing unit (CPU), a graphics processing unit (GPU) or other form of processing unit having data processing capabilities and/or program execution capabilities. For example, the central processing unit (CPU) may be an X86 or ARM architecture or the like. The processor 911 may be a general-purpose processor or a dedicated processor that may control other components in the electronic device 910 to perform desired functions.

For example, the memory 912 may include any combination of one or more computer program products, which may include various forms of computer-readable storage media, such as volatile memory and/or non-volatile memory. The volatile memory may include, for example, Random Access Memory (RAM), and/or cache, etc. The non-volatile memory may include, for example, Read-Only Memory (ROM), hard disks, Erasable Programmable Read-Only Memory (EPROM), portable Compact Disk Read-Only Memory (CD-ROM), USB memory, flash memory, etc. One or more computer program modules may be stored on a computer readable storage medium and executed by the processor 911 to perform various functions of the electronic device 910. The computer readable storage medium may further store various applications and various data as well as various data used and/or generated by the applications, etc.

It should be appreciated that, in the embodiment of the present disclosure, specific functions and technical effects of the electronic device 910 may be found from the above description of the data interaction method, and will not be described in detail any more.

Figure 8:
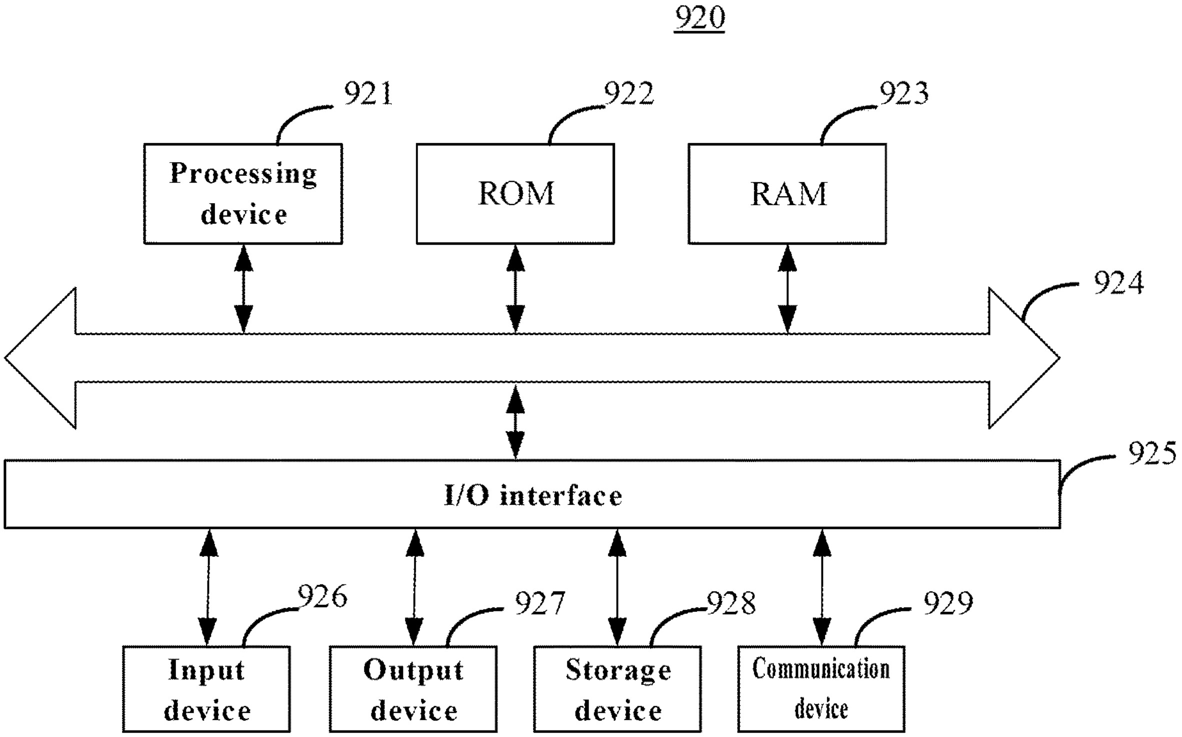
FIG. 8 is a schematic block diagram of another electronic device provided by some embodiments of the present disclosure.

FIG. 8 is a schematic block diagram of another electronic device according to an embodiment of the present disclosure. The electronic device 920 is for example adapted to implement the data interaction method provided by the embodiments of the present disclosure. The electronic device 920 may be a terminal device for implementing a client or a server. The electronic device 920 may comprise, but not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. It needs to be appreciated that the electronic device 920 shown in FIG. 8 is merely an example and should not impose any limitations on the functionality and scope of use of embodiments of the present disclosure.

As shown in FIG. 8, the electronic device 920 may comprise a processing device (e.g., a central processing unit, a graph processor, etc.) 921 that may perform various suitable actions and processes in accordance with a program stored in a read only memory (ROM) 922 or a program loaded from a storage device 928 into a random access memory (RAM) 923. In the RAM 923, various programs and data needed by the operation of the electronic device 920 are also stored. The processing device 921, the ROM 922, and the RAM 923 are connected to each other through a bus 924. An input/output (I/O) interface 925 is also coupled to bus 924.

In general, the following devices may be connected to the I/O interface 925: an input device 926 including, for example, a touch screen, a touch pad, a keyboard, a mouse, a camera, a microphone, an accelerometer, a gyroscope, etc.; an output device 927 including, for example, a liquid crystal display (LCD), a speaker, a vibrator, etc.; a storage device 928 including, for example, a magnetic tape, a hard disk, etc.; and a communication device 929. The communication device 929 may allow the electronic device 920 to communicate in a wireless or wired manner with other devices to exchange data. While FIG. 8 illustrates the electronic device 920 having various devices, it is to be understood that not all illustrated device are required to be implemented or provided. More or fewer devices may alternatively be implemented or provided.

For example, according to embodiments of the present disclosure, the above data interaction method may be implemented as computer software programs. For example, embodiments of the present disclosure comprise a computer program product comprising a computer program carried on a non-transitory computer-readable medium, the computer program comprising program code for performing the data interaction method. In such embodiments, the computer program may be downloaded and installed from a network through the communication means 929, or installed from the storage device 928, or installed from the ROM 922. When the computer program is executed by the processing device 921, the above-described functions defined in the data interaction method of the embodiment of the present disclosure are performed.

Figure 9:
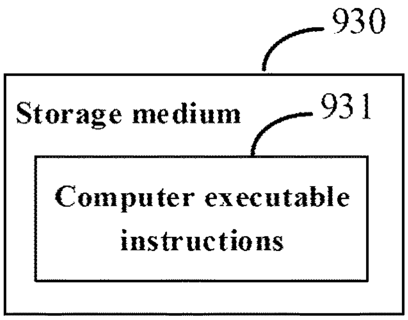
FIG. 9 is a schematic diagram of a storage medium provided by some embodiments of the present disclosure.

FIG. 9 is a schematic diagram of a storage medium provided by some embodiments of the present disclosure. For example, as shown in FIG. 9, the storage medium 930 may be a non-transitory computer-readable storage medium for storing non-transitory computer-executable instructions 931. The data interaction method of embodiments of the present disclosure may be implemented when the non-transitory computer-executable instructions 931 are executed by a processor, for example, one or more steps of the data interaction method described above may be performed when the non-transitory computer-executable instructions 931 are executed by the processor.

For example, the storage medium 930 may be applied in the above-mentioned electronic device described above, e.g., the storage medium 930 may comprise a memory in the electronic device.

For example, the storage medium may include a memory card of a smartphone, a storage component of a tablet computer, a hard disk of a personal computer, a Random Access Memory (RAM), a Read-Only Memory (ROM), an Erasable Programmable Read-Only Memory (EPROM), a portable Compact Disc Read-Only Memory (CD-ROM), a flash memory, or any combinations of the above storage media, or may also be any other suitable storage medium.

For example, reference may be made to the description of the memory in embodiments of the electronic device for the description of the storage medium 930, and detailed description will not be presented any more here. Specific functions and technical effects of the storage medium 930 may be found from the above description of the data interaction method, and will not be described in detail any more.

It is appreciated that the computer-readable medium in the context of the present disclosure may be can be a tangible medium that can contain or store a program for use by or in connection with an instruction execution system, apparatus, or device. The computer-readable medium may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be sent with any suitable medium including, but not limited to: electrical wire, optic cable, RF (radio frequency), and the like, or any suitable combinations thereof.

Other embodiments of the present disclosure will be readily envisaged by those skilled in the art after considering the specification and putting the invention disclosed herein into practice. The present disclosure is intended to cover any variations, uses, or adaptations of the present disclosure following general principles of the present disclosure and including common knowledge or customary technical means in the technical field not disclosed by the present disclosure. The description and embodiments are only considered as exemplary, and the true scope and spirit of the present disclosure are defined by the appended claims.

It is to be understood that the present disclosure is not limited to precise structures described above and shown in the accompanying drawings, and that various modifications and changes may be made without departing from the scope thereof. The scope of the present disclosure is limited only by the appended claims.

We claim:

1. A data interaction method, comprising:

establishing a long-connection communication channel with a local service end, the local service end comprising a target transaction system to be integrated and a connector deployed for the target transaction system;

receiving first target data sent by the local service end through the long-connection communication channel, the first target data being obtained based on updated first transaction data of the target transaction system;

performing data update using the first target data; and wherein the connector is configured to obtain the updated first transaction data during a first time period and obtain update information related to the updated first transaction data during a second time period, and perform data synchronization check based on the updated first transaction data and the update information, wherein the first time period is shorter than the second period.

2. The method of claim 1, wherein the method is applied to a cloud service end; the cloud service end comprises a unified transaction system and a communication center deployed for the unified transaction system;

wherein establishing the long-connection communication channel with the local service end comprises: establishing the long-connection communication channel between the communication center and the connector;

wherein receiving the first target data sent by the local service end through the long-connection communication channel comprises: receiving, by the communication center, the first target data sent by the connector through the long-connection communication channel, and sending, by the communication center, the first target data to the unified transaction system;

wherein performing data update using the first target data comprises: performing, by the unified transaction system, the data update using the first target data.

3. The method of claim 2, wherein establishing the long-connection communication channel between the communication center and the connector comprises:

receiving, by the unified transaction system, a first request sent by the connector to obtain a target token, obtaining, by the unified transaction system, the target token from the communication center, and returning, by the unified transaction system, the target token to the connector;

receiving, by the communication center, a second request sent by the connector and carrying the target token, and performing, by the communication center, identity check based on the target token; and establishing, by the communication center, the long-connection communication channel with the connector when the identity check passes.

4. The method of claim 3, wherein the first request is sent based on a first protocol, and the protocol on which the long-connection communication channel is established with the connector is a second protocol, and the second protocol is different from the first protocol.

5. The method of claim 2, wherein the method further comprises:

in a case where the data update fails, sending, by the unified transaction system through the communication center, a data resend request via the long-connection communication channel to the connector; and receiving, by the communication center, data resent by the connector based on the data resend request and sending, by the communication center, the resent data to the unified transaction system.

6. The method of claim 2, wherein the method further comprises:

providing, by the unified transaction system, the user with a transaction processing interface, and generating, by the unified transaction system, task data based on a processing operation performed by the user through the transaction processing interface, the task data corresponding to at least one target task;

sending, by the unified transaction system through the communication center, the task data via the long-connection communication channel to the connector, to cause the connector to send target task data to the target transaction system after the converting the task data into the target task data, and processing, by the target transaction system, the target task based on the target task data.

7. The method of claim 6, wherein the processing operation performed by the user through the transaction processing interface comprises batch unified processing performed on the target tasks.

8. The method of claim 6, wherein after sending the task data to the connector, the method further comprises:

receiving, by the communication center, a task processing progress of processing the target task sent by the target transaction system through the connector, and sending, by the communication center, the task processing progress to the unified transaction system;

updating, by the unified transaction system, task progress data based on the task processing progress.

9. The method of claim 6, wherein after sending the task data to the connector, the method further comprises:

receiving, by the communication center, a task resend request sent by the target transaction system in the case of failed task processing, and sending, by the communication center, the task resend request to the unified transaction system;

obtaining, by the unified transaction system, resend task data based on the task resend request, and sending, by the unified transaction system through the communication center, the resend task data via the long-connection communication channel to the connector.

10. A non-transitory computer readable storage medium storing a computer program which, when executed in a computer, causes the computer to perform:

establish a long-connection communication channel with a local service end, the local service end comprising a target transaction system to be integrated and a connector deployed for the target transaction system;

receive first target data sent by the local service end through the long-connection communication channel, the first target data being obtained based on updated first transaction data of the target transaction system;

perform data update using the first target data; and wherein the connector is configured to obtain the updated first transaction data during a first time period and obtain update information related to the updated first transaction data during a second time period, and perform data synchronization check based on the updated first transaction data and the update information, wherein the first time period is shorter than the second period.

11. The non-transitory computer readable storage medium of claim 10, wherein the cloud service end comprises a unified transaction system and a communication center deployed for the unified transaction system;

wherein establishing the long-connection communication channel with the local service end comprises: establishing the long-connection communication channel between the communication center and the connector;

wherein receiving the first target data sent by the local service end through the long-connection communication channel comprises: receiving, by the communication center, the first target data sent by the connector through the long-connection communication channel, and sending, by the communication center, the first target data to the unified transaction system;

wherein performing data update using the first target data comprises: performing, by the unified transaction system, the data update using the first target data.

12. The non-transitory computer readable storage medium of claim 11, wherein establishing the long-connection communication channel between the communication center and the connector comprises:

receiving, by the unified transaction system, a first request sent by the connector to obtain a target token, obtaining, by the unified transaction system, the target token from the communication center, and returning, by the unified transaction system, the target token to the connector;

receiving, by the communication center, a second request sent by the connector and carrying the target token, and performing, by the communication center, identity check based on the target token; and establishing, by the communication center, the long-connection communication channel with the connector when the identity check passes.

13. The non-transitory computer readable storage medium of claim 12, wherein the first request is sent based on a first protocol, and the protocol on which the long-connection communication channel is established with the connector is a second protocol, and the second protocol is different from the first protocol.

14. The non-transitory computer readable storage medium of claim 11, wherein the computer is further caused to:

in a case where the data update fails, sending, by the unified transaction system through the communication center, a data resend request via the long-connection communication channel to the connector; and receiving, by the communication center, data resent by the connector based on the data resend request and sending, by the communication center, the resent data to the unified transaction system.

15. The non-transitory computer readable storage medium of claim 11, wherein the computer is further caused to:

providing, by the unified transaction system, the user with a transaction processing interface, and generating, by the unified transaction system, task data based on a processing operation performed by the user through the transaction processing interface, the task data corresponding to at least one target task;

sending, by the unified transaction system through the communication center, the task data via the long-connection communication channel to the connector, to cause the connector to send target task data to the target transaction system after the converting the task data into the target task data, and processing, by the target transaction system, the target task based on the target task data.

16. The non-transitory computer readable storage medium of claim 15, wherein the processing operation performed by the user through the transaction processing interface comprises batch unified processing performed on the target tasks.

17. The non-transitory computer readable storage medium of claim 15, wherein after sending the task data to the connector, the method further comprises:

receiving, by the communication center, a task processing progress of processing the target task sent by the target transaction system through the connector, and sending, by the communication center, the task processing progress to the unified transaction system;

updating, by the unified transaction system, task progress data based on the task processing progress.

18. The non-transitory computer readable storage medium of claim 15, wherein after sending the task data to the connector, the method further comprises:

receiving, by the communication center, a task resend request sent by the target transaction system in the case of failed task processing, and sending, by the communication center, the task resend request to the unified transaction system;

obtaining, by the unified transaction system, resend task data based on the task resend request, and sending, by the unified transaction system through the communication center, the resend task data via the long-connection communication channel to the connector.

19. An electronic device comprising a memory and a processor, the memory storing executable code which, when executed by the electronic device, causes the processor to:

establish a long-connection communication channel with a local service end, the local service end comprising a target transaction system to be integrated and a connector deployed for the target transaction system;

receive first target data sent by the local service end through the long-connection communication channel, the first target data being obtained based on updated first transaction data of the target transaction system;

perform data update using the first target data; and wherein the connector is configured to obtain the updated first transaction data during a first time period and obtain update information related to the updated first transaction data during a second time period, and perform data synchronization check based on the updated first transaction data and the update information, wherein the first time period is shorter than the second period.

20. The electronic device of claim 19, wherein the cloud service end comprises a unified transaction system and a communication center deployed for the unified transaction system;

wherein establishing the long-connection communication channel with the local service end comprises: establishing the long-connection communication channel between the communication center and the connector;

wherein receiving the first target data sent by the local service end through the long-connection communication channel comprises: receiving, by the communication center, the first target data sent by the connector through the long-connection communication channel, and sending, by the communication center, the first target data to the unified transaction system;

wherein performing data update using the first target data comprises: performing, by the unified transaction system, the data update using the first target data.

* * * * *